United States Patent Office 3,769,422
Patented Oct. 30, 1973

3,769,422
N-ARYLALKYLIMIDAZOLE FUNGICIDAL AGENTS
Helmut Timmler, Wuppertal-Vohwinkel, Wilfried Draber and Karl Heinz Büchel, Wuppertal-Elberfeld, Ferdinand Grewe, Burscheid, and Helmut Kaspers and Hans Scheinpflug, Leverkusen, Germany, assignors to Bayer Aktiengesellschaft, Leverkusen, Germany
No Drawing. Filed Feb. 17, 1971, Ser. No. 116,291
Claims priority, application Germany, Feb. 29, 1970, P 20 07 794.5
Int. Cl. A01n 9/22
U.S. Cl. 424—273                                11 Claims

ABSTRACT OF THE DISCLOSURE

Fungicidal compositions of and methods of combating fungi using certain N - arylalkylimidazoles of the formula

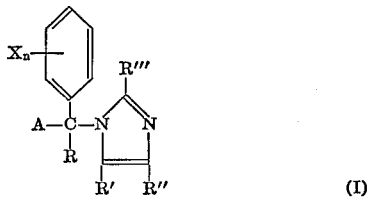

in which
R is an aliphatic or cycloaliphatic radical with up to 20 carbon atoms,
R', R" and R''', which may be the same or different, are hydrogen, or alkyl, alkenyl or cycloalkyl with up to 6 carbon atoms,
A is an optionally substituted aryl, pyridyl, aliphatic or cycloaliphatic radical with up to 12 carbon atoms,
X is an alkyl, alkoxy or alkylmercapto radical with up to 6 carbon atoms, or an aryloxy or phenyl radical, or an electronegative radical or a basic radical, and
$n$ is 0, 1 or 2,
as well as salts of these compounds.

---

The present invention relates to and has for its objects the provision of fungicidal compositions of certain N-arylalkylimidazoles, i.e. N-benzylimidazoles in which the carbon atom of the methyl group is further substituted, as well as salts thereof in the form of mixtures of such compounds with solid and liquid dispersible carrier vehicles, preferably containing a surface-active agent, and methods for using such compounds in a new way especially for combating fungi with other and further objects becoming apparent from a study of the within specification and accompanying examples.

The substances themselves, and their production are the subject of another patent application.

It is known from U.S. patent specification 3,321,366 that N-tritylimidazoles in general exhibit good fungicidal properties. At low concentrations, however, such compounds do not exhibit satisfactory effectiveness against various species of fungi from the class of the Ascomycetes.

It has now been found the N-arylalkylimidazoles of the formula.

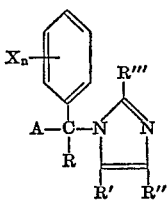

in which
R is an aliphatic or cycloaliphatic radical with up to 20 carbon atoms,
R', R" and R''', which may be the same or different, are hydrogen, or alkyl, alkenyl or cycloalkyl with up to 6 carbon atoms,
A is an optionally substituted aryl, pyridyl, aliphatic or cycloaliphatic radical with up to 12 carbon atoms,
X is an alkyl, alkoxy or alkylmercapto radical with up to 6 carbon atoms, or an aryloxy or phenyl radical, or an electronegative radical or a basic radical, and
$n$ is 0, 1 or 2.

as well as the salts of these compounds, exhibit strong fungicidal properties.

The invention therefore provides a fungicidal composition containing as active ingredient a compound of Formula I or a salt thereof in admixture with a solid diluent or carrier or in admixture with a liquid diluent or carrier containing a surface-active agent.

The invention also provides a method of combating fungi which comprises applying to the fungi or a habitat thereof a compound of Formula I or a salt thereof alone or in the form of a composition containing as active ingredient a compound of Formula I or a salt thereof in admixture with a solid or liquid diluent or carrier.

The invention also provides crops protected from damage by fungi by being grown in areas in which, immediately prior to and/or during the time of the growing, a compound of Formula I or a salt thereof was applied alone or in admixture with a solid or liquid diluent or carrier. It will be seen that the invention therefore provides an improved method of producing harvested crops, for example with greater yields.

Surprisingly, the N-arylalkylimidazoles used according to the invention show a considerably higher fungicidal activity than the N-tritylimidazoles known from the prior art which are the chemically closest active compounds of the same type of activity. This applies particularly to the control of fungi from the family of the Erysiphaceae which cause powdery mildew on plants. The use of the substances in accordance with the invention therefore represents a valuable enrichment of the art.

These substances are defined generally by the above Formula I. In this formula R preferably has up to 12 carbon atoms; the cycloaliphatic radicals may contain endomethylene bridges. R', R" and R''' are preferably hydrogen, or alkyl or alkenyl with up to 4 carbon atoms. A is preferably phenyl or pyridyl which may be substituted by fluorine, chlorine or methyl; or an aliphatic or cycloaliphatic radical with up to 6 carbon atoms. X is preferably alkyl, alkoxy or alkylmercapto with, in each case, up to 4 carbon atoms; or phenyl or phenoxy; or fluorine or chlorine, or nitro, cyano or trifluoromethyl; or amino or dialkylamino groups in which the alkyl groups may together form a ring. Preferably, $n$ is 0 or 1.

As examples of substances which can be used according to the invention, there are listed the following compounds:

1-imidazolyl-(1)-1,1-bisphenyl-2,2,2-trimethyl-ethane,
1-imidazolyl-(1)-1-(4-chlorophenyl)-1-phenyl-2,2,2-trimethyl-ethane,
1-imidazolyl-(1)-1-(4-fluorophenyl)-1-phenyl-2,2,2-trimethyl-ethane,
1-imidazolyl-(1)-1-(3-chlorophenyl)-1-phenyl-2,2,2-trimethyl-ethane,
1-imidazolyl-(1)-1-(3-methylphenyl)-1-phenyl-2,2,2-trimethyl-ethane,
1-imidazolyl-(1)-1-(2-methylphenyl)-1-phenyl-2,2,2-trimethyl-ethane, 1-imidazolyl-(1)-1-(4-methylphenyl)-1-phenyl-2,2,2-trimethyl-ethane,
1-imidazolyl-(1)-1-(4-phenoxyphenyl)-1-phenyl-2,2,2-trimethyl-ethane,
1-imidazolyl-(1)-1-(4-methoxyphenyl)-1-phenyl-2,2,2-trimethyl-ethane,
1-imidazolyl-(1)-1-(4-methylthiophenyl)-1-phenyl-2,2,2-trimethyl-ethane,
imidazolyl-(1)-bisphenyl-cyclohexyl-methane,
imidazolyl-(1)-phenyl-(4-chlorophenyl)-cyclohexyl-methane,
imidazolyl-(1)-phenyl-(3-chlorophenyl)-cyclohexyl-methane,
imidazolyl-(1)-phenyl-(2-chlorophenyl)-cyclohexyl-methane,
imidazolyl-(1)-phenyl-(4-fluorophenyl)-cyclohexyl-methane,
imidazolyl-(1)-pyridyl-(4)-phenyl-cyclohexyl-methane,
1-imidazolyl-(1)-1-pyridyl-(4)-1-phenyl-2,2,2-trimethyl-ethane,
imidazolyl-(1)-pyridyl-(4)-phenyl-cyclopropyl-methane,
imidazolyl-(1)-phenyl-bis-cyclohexyl-methane,
imidazolyl-(1)-phenyl-bis-cyclopropyl-methane,
imidazolyl-(1)-phenyl-(4-chlorophenyl)-isopropyl-methane,
3-imidazolyl-(1)-2,4,4-trimethyl-3-phenyl-pentane,
imidazolyl-(1)-bisphenyl-cyclopropyl-methane,
1-imidazolyl-(1)-1,1-bisphenyl-ethane,
1-imidazolyl-(1)-1-(4-chlorophenyl)-1-phenyl-ethane,
imidazolyl-(1)-bisphenyl-(2-methyl-bicyclo-(2,2,1)-heptyl-(2))-methane,
imidazolyl-(1)-bisphenyl-adamantyl-methane,
imidazolyl-(1)-p-chlorophenyl-phenyl-adamantyl-methane,
imidazolyl-(1)-o-chlorophenyl-phenyl-admantyl-methane.

As salts of the N-arylalkylimidazoles, those with physiologically compatible acids are generally suitable. Examples of such acids are the halogen hydracids, phosphoric acids, sulphonic acids, mono- and di-carboxylic acids and hydroxycarboxylic acids.

The substances which can be used according to the invention can be prepared in simple manner according to processes known in principle. They are obtained for example when a compound of the formula

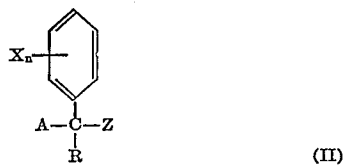

(II)

in which

A, R, X and $n$ have the meanings stated in Formula I, and
Z is chlorine or bromine, are reacted, optionally in the presence of an acid acceptor, with at least the theoretically necessary amount of an imidazole, which may be substituted by lower alkyl radicals, in an organic solvent in the temperature range of 20 to 150° C.

The halogen derivatives of the Formula II required as starting materials for this reaction are known or can be obtained from the appropriate hydroxy derivatives by treatment with a halogenating agent, such as thionyl chloride, thionyl bromide, phosphoryl chloride, phosphoryl bromide, acetyl chloride, acetyl bromide, and the like, in solvents such as ether, methylene chloride, benzene or toluene.

The imidazoles to be reacted with the compound of the Formula II especially imidazole itself, are known. The reaction of the halogen derivatives of the Formula II with imidazole or substiuted imidazoles takes place preferably in a polar solvent, such as acetonitrile, nitromethane, dimethyl formamide or hexamethylphosphoric acid triamide.

As acid acceptors, organic bases, such as pyridine, triethylamine, quinoline, as well as alkali metal carbonates, e.g. potassium carbonate, or the imidazole itself used in excess, can be employed.

The isolation of the N-arylalkylimidazoles takes place in customary manner, for example by concentration, or dilution with water.

The active compounds of Formula I used according to the invention exhibit a strong fungicidal activity. Because of their low toxicity to warm-blooded animals they are suitable for the control of undesired fungal growth. Their general toleration by higher plants permits their use as crop protection agents against fungal plant diseases.

The active compounds are particularly suitable for the control of phytopathogenic fungi, on above-the-soil parts of plants as well as against phytopathogenic fungi which attack the plant from the soil.

The compounds possess a great breadth of activity. They act against a large number of phytopathogenic fungi from the most diverse systematic groups (fungi Imperfecti, phycomycetes, Ascomycetes, Basidiomycetes). It is a particular interest to the art that, within the class of the Ascomycetes, the substances are effective against very diverse forms, such as Erysiphen and Podosphaera species from the Family of the Erysiphacea (causative organism of powdery mildew diseases) and Venturia species (scab disesases on pip fruit). As a result of this, it is possible to control both fungus groups simultaneously with substances according to the invention.

The active compounds can, however, also be used with good results for the control of other phytopathogenic fungi, for example fungi which cause diseases in rice and ornamental plants. The active compounds show a good activity against *Piricularia oryzae, Pellicularia sasakii* and *Cochliobolus miyabeanus,* three pathogenic agents which occur in rice, and against *Cercospora musae.*

The active compounds are distinguished by a high effectiveness in low concentrations and by a satisfactory toleration by plants. Application of higher concentrations may inhibit plant growth.

The compounds also possess an effectiveness against mould fungi, against *Staphylococcus aurens* and against spore formers.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, sprays powders, pastes, soluble powders dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide etc.), ketones (e.g. acetone, etc.), and/or water; as well as inert dispersible finely divided solid carriers, such as ground natural minerals (e.g. kaolins, alumina, silica, chalk, i.e., calcium carbonate, talc, kieselguhr, etc.) and ground synthetic minerals (e.g. highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides and acaricides, or insecticides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.00001–2%, preferably 0.0001–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.0001–95% by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart-acre, preferably 2–16 fluid ounces/acre, are sufficient. In this process it is possible to use highly concentrated liquid compositions with said liquid carrier vehicles containing from about 10 to about 80% and preferably about 20 to 60%, by weight of active compound or even the 100% active substance alone, e.g. about 10–100% by weight of the active compound.

Furthermore, the present invention contemplates methods of selectively killing, combating or controlling pests, e.g. fungi which comprise applying to at least one of correspondingly (a) such fungi, and (c) the corresponding habitat thereof, i.e., the locus to be protected, a correspondingly combative or toxic amount, i.e. a fungicidally effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, via dressings, incrustations, and the like It will be realized, of course, that the concentration of the particular active compound utilized in admixture with the carrier vehicle will depend upon the intended application. Therefore, in special cases, it is possible to go above or below the aforementioned concentration ranges.

The following Table 1 lists a number of specific compounds which can be used according to the present invention. These compounds are all of the general formula (I) in which R′, R″ and R′″ are all hydrogen. The meanings of X, $n$, A and R are indicated in Table 1 for each compound.

TABLE 1

| Compound No. | X | $n$ | A | R | Properties melting point (° C.) |
|---|---|---|---|---|---|
| 1 | | 0 |  | Tert.-$C_4H_9$ | 120. |
| 2 | 4-Cl | 1 | Same as above | Same as above | 137. |
| 3 | 4-F | 1 | do | do | 117. |
| 4 | 3-Cl | 1 | do | do | 90. |
| 5 | | 0 | do | Tert.-$C_4H_9$ (hydrocloride) | 170. |
| 6 | 4-Cl | 1 | do | do | 181. |
| 7 | 4-$CH_3$ | 1 | do | Tert.-$C_4H_9$ | 139. |
| 8 | 3-$CH_3$ | 1 | do | Same as above | 87. |
| 9 | | 1 | 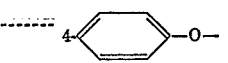 | do | Oil, $n_D^{24}$=1.5683. |
| 10 | | 0 | 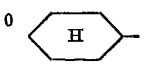 | 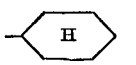 | 150–153. |
| 11 | | 0 |  | Same as above | 85–86. |
| 12 | 4-$CH_3S$— | 1 | 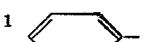 | Tert.-$C_4H_9$ (hydrochloride) | 140. |
| 13 | 2-$CH_3$ | 1 | Same as above | Tert.-$C_4H_9$ | 112. |
| 14 | | 0 | do |  | 110. |

TABLE 1—Continued

| Compound No. | X | n | A | R | Properties melting point (° C.) |
|---|---|---|---|---|---|
| 15 | | 0 | do |  CH₃ | 122. |
| 16 | | 0 |  CH₂\CH—/CH₂ |  —CH(CH₂)(CH₂) (hydrochloride). | 155. |
| 17 | | 0 | 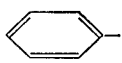 | —CH₃ (hydrochloride) | 195. |
| 18 | | 0 | Same as above |  (hydrochloride). | 117–119. |
| 19 | | 0 | do |  | 80–83. |
| 20 | | 0 | 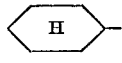 H |  H (hydrochloride). | 247–249. |
| 21 | | 0 | 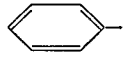 | —CH(CH₃)(CH₃) | 112. |
| 22 | {3-CH₃ / 4-CH₃} | 2 | Same as above | Tert.-C₄H₉ | 78. |
| 23 | | 0 | do | —CH₂—CH=CH₂ | 80. |
| 24 | | 0 | do | —C₂H₅ | 65. |
| 25 | 2-CH₃ | 1 | do | —CH₃ | Oil $n_D^{32}$=1.5988. |
| 26 | 3-CH₃ | 1 | do | —CH₃ | Oil $n_D^{32}$=1.5970. |
| 27 | 4-CH₃ | 1 | do | —CH₃ | Oil $n_D^{32}$=1.5951. |
| 28 | 4-F | 1 | do | —C₂H₅ | Oil $n_D^{32}$=1.5868. |
| 29 | 4-Cl | 1 | do | —C₂H₅ | Oil $n_D^{32}$=1.6030. |
| 30 | 4-CH₃ | 1 | | —C₂H₅ | Oil $n_D^{32}$=1.5892. |
| 31 | {2-CH₃ / 4-CH₃} | 2 | | —C₂H₅ | Oil $n_D^{32}$=1.5851. |
| 32 | | 0 |  | —CH=CH₂ | 108. |
| 33 | {2-CH₃ / 5-CH₃} | 2 | Same as above | Tert.-C₄H₉ | 112. |
| 34 | {2-CH₃ / 4-CH₃} | 2 | do | Same as above | 161. |
| 35 | {2-CH₃ / 3-CH₃} | 2 | do | do | 143. |
| 36 | {3-CH₃ / 4-CH₃} | 2 | do | —C₂H₅ | Oil $n_D^{30}$=1.5908. |
| 37 | {2-CH₃ / 5-CH₃} | 2 | do | —C₂H₅ | Oil $n_D^{30}$=1.5867. |
| 38 | 4-F | 1 | do | —CH₃ | Oil $n_D^{30}$=1.5866. |
| 39 | 3-CH₃ | 1 | 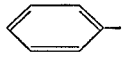 N | —CH₃ | Oil $n_D^{30}$=1.5941. |
| 40 | {3-CH₃ / 4-CH₃} | 2 | 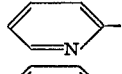 | —CH₃ | Oil $n_D^{30}$=1.5984. |
| 41 | 3-CH₃ | 1 | Same as above | Sec.-C₄H₉ (hydrochloride) | 145. |
| 42 | 4-CH₃ | 1 | do | do | 145. |
| 43 | {2-CH₃ / 4-CH₃} | 2 | do | do | 134. |
| 44 | {3-CH₃ / 4-CH₃} | 2 | do | do | 145. |
| 45 | 3-Cl | 1 | do | do | 144. |
| 46 | 4-F | 1 | do | do | 146. |
| 47 | {2-CH₃ / 5-CH₃} | 2 | do | do | 138. |
| 48 | 2-Cl | 1 | do | do | 140. |
| 49 | 4-Cl | 1 | do | do | 141. |
| 50 | 3-CH₃ | 1 | do | 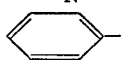 CH₂\CH—/CH₂ | 136. |

TABLE 1—Continued

| Compound No. | X | n | A | R | Properties melting point (° C.) |
|---|---|---|---|---|---|
| 51 | 4-CH₃ | 1 | do | CH₂–CH–CH₂ (cyclopropyl) (hydrochloride) | 115. |
| 52 | 2-CH₃, 3-CH₃ | 2 | do | Same as above | 110. |
| 53 | 2-CH₃, 4-CH₃ | 2 | do | do | 108. |
| 54 | 3-CH₃, 4-CH₃ | 2 | do | CH₂–CH–CH₂ (hydrochloride) | 125. |
| 55 | 2-CH₃, 5-CH₃ | 2 | do | Same as above | 112. |
| 56 |  | 0 | do | 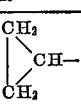 | 111. |
| 57 | 4-Cl | 1 | do |  (hydrochloride) | 95. |
| 5 | 4-CH₃ | 1 | 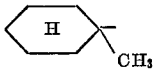 |  | 151. |
| 59 | 4-Cl | 1 | 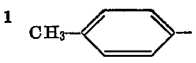 | 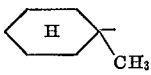 (hydrochloride) | 175. |
| 60 | 4-F | 1 | 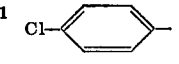 | 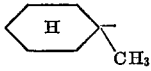 | 151. |
| 61 | 3-Cl | 1 | Same as above | CH₂–CH–CH₂ (hydrochloride) | 110. |
| 62 | 2-Cl | 1 | do | Same as above | 80. |
| 63 | 4-SCH₃ | 1 | do | do | 90. |
| 64 | 4-Cl | 1 | do | do | 99. |
| 65 | 4-F | 1 | 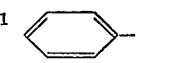 | CH₂–CH–CH₂ (hydrochloride) | 60. |
| 66 | 4-F | 1 | Same as above | Tert.-C₄H₉ (hydrochloride) | 177. |
| 67 |  | 0 | 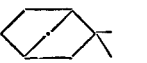 | Iso-C₃H₇ | 112. |
| 68 | 3-CH₃, 4-Cl | 2 | Same as above | Tert.-C₄H₉ | 95. |
| 69 |  | 0 |  | –C₃H₇ | 87. |
| 70 |  | 0 | 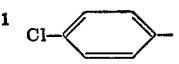 | $\underset{\mathrm{C_2H_5}}{-\mathrm{CH-CH_2-CH_2}}$ (hydrochloride) | 185. |
| 71 | 4-Cl | 1 | Same as above | –C₃H₇ (hydrochloride) | 145. |
| 72 | 3-CH₃ | 1 | do | do | 160. |
| 73 |  | 0 | do | –C₄H₉ (hydrochloride) | 164. |
| 74 |  | 0 | do | Iso-C₄H₉ | 170. |
| 75 | 4-Cl | 1 | do | Iso-C₄H₉ (hydrochloride) | 160. |
| 76 | 4-Cl | 1 | do | C₄H₉– (hydrochloride) | 164. |
| 77 |  | 0 | do | $\underset{\mathrm{CH_3}}{-\overset{\mathrm{H}}{\mathrm{C}}-\mathrm{CH_2-CH_2-CH_3}}$ (nitrate) | 162. |

TABLE 1—Continued

| Compound No. | X | n | A | R | Properties melting point (° C.) |
|---|---|---|---|---|---|
| 78 | 4-F | 1 | ...do... | C₃H₇— (nitrate) | 142. |
| 79 | 3-CF₃ | 1 | phenyl | Tert.-C₄H₉— (hydrochloride) | 209. |
| 80 | 2-Cl | 1 | phenyl | Tert. C₄H₉— | Oil. |
| 81 | 4-Cl | 1 | Cl-phenyl | Tert. C₄H₉— (hydrochloride) | 196. |
| 82 | 4-F | 1 | phenyl | ...do... | 173. |
| 83 | 4-Cl | 1 | Same as above | cyclohexyl | 125. |
| 84 | | 0 | ...do... | cyclopentyl (nitrate) | 188. |
| 85 | 4-Cl | 1 | ...do... | cyclopentyl (hydrochloride) | 206. |
| 86 | 4-F | 1 | ...do... | cyclopentyl (naphthaline-disulfonate) | 203. |
| 87 | 4-CH₃ | 1 | ...do... | Same as above | 170. |
| 88 | 3-CH₃ | 1 | ...do... | ...do... | 175. |
| 89 | 4-CH₃ | 1 | ...do... | Tert. C₄H₉— (naphthaline-disulfonate) | 182. |
| 90 | 4-OCH₃ | 1 | ...do... | Tert. C₄H₉— | 56. |
| 91 | 4-OC₂H₅ | 1 | ...do... | Tert. C₄H₉ (nitrate) | 125. |

The invention is illustrated by the following examples. Example 1 illustrates the preparation of the active compounds. In Examples 2 to 8, which illustrate the effectiveness of some of these compounds, the compounds are identified by numbers corresponding to those in Table 1.

EXAMPLE 1

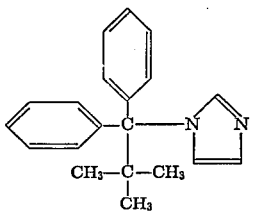

25.9 g. (0.1 mole) of 1-chloro-1,1-diphenyl-2,2,2-trimethylethane of the melting point 67° C. are dissolved in 200 ml. of hexamethylphosphoric acid triamide and stirred with 68 g. (1 mole) of imidazole for 15 hours at 170° C. The solvent is then distilled off in a vacuum, the residue is digested with water and filtered off with suction. After recrystallization from the twenty-fold amount of ligroin, 19.4 g. 1-imidazolyl-(1)-1,1-bisphenyl-2,2,2-trimethylethane of the melting point 120° C. are obtained. The yield is 67% of the theory.

The product can also be prepared starting from the 1-bromo compound.

The othed compounds in Table 1 can be prepared by analogous methods.

EXAMPLE 2

Fusicladium test (apple scab) (Protective):
 Solvent: 4.7 parts by weight acetone
 Emulsifier: 0.3 parts by weight alkylaryl polyglycol ether
 Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are sprayed with the spray liquid until dripping wet. The plants remain in a greenhouse for 24 hours at 20° C. and at a relative atmospheric humidity of 70%. They are then inoculated with an aqueous conidium suspension of the apple scab causative organism (*Fusicladium dendriticum* Fuckel) and incubated for 18 hours in a humidity chamber at 18–20° C. and at a relative atmospheric humidity of 100%.

The plants then again come into a greenhouse for 14 days.

15 days after inoculation, the infection of the seedlings is determined as a percentage of the untreated but also inoculated control plants.

0% means no infection; 100% means that the infection is exactly as great as in the case of the control plants.

The active compounds, the concentrations of the active compounds and the results can be seen from Table 2.

TABLE 2.—FUSICLADIUM TEST/PROTECTIVE

| Active compound | Infection as a percentage of the infection of the untreated control with a concentration of active compound (in percent) of— | | |
|---|---|---|---|
| | 0.025 | 0.0062 | 0.00156 |
| 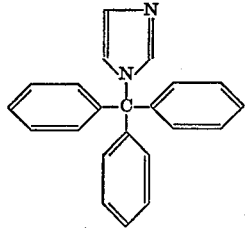 (known) | 84 | | |
| 1 | 0 | 17 | 61 |
| 2 | 6 | 16 | 37 |
| 3 | 0 | 4 | 51 |

EXAMPLE 3

Erysiphe test:
    Solvent: 4.7 parts by weight acetone
    Emulsifier: 0.3 part by weight alkylaryl polyglycol ether
    Water: 95.0 parts by weight The amount of the active compound required for the desired concentration of active compound in the spray liquid is mixed with the stated amount of the solvent, and the concentrate is diluted with the stated amount of water containing the stated additions.

Young cucumber plants with about three foliage leaves are sprayed with the spray liquid until dripping wet. The cucumber plants remain in a greenhouse for 24 hours to dry. They are then, for the purpose of inoculation, dusted with conidia of the fungus *Erysiphe cichoracearum*. The plants are subsequently placed in a greenhouse at 23–24° C. and at a relative atmospheric humidity of about 75%.

After 12 days, the infection of the cucumber plants is determined as a percentage of the untreated but also inoculated control plants. 0% means no infection; 100% that the infection is exactly as great as in the case of the control plants.

The active compounds, the concentrations of the active compounds and the results obtained can be seen from the following Table 3.

TABLE 3.—ERYSIPHE TEST

| Active compound | Infestion as a percentage of the infection of the untreated control with a concentration of active compound (in percent) of— | |
|---|---|---|
| | 0.00078 | 0.00019 |
| 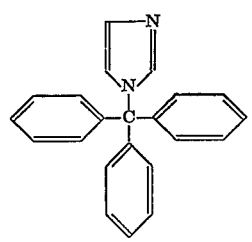 (known) | 7 | 26 |
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | 0 | 0 |
| 9 | 7 | 20 |

EXAMPLE 4

Fusicladium test (apple scab) [Curative]:
    Solvent: 4.7 parts by weight acetone
    Emulsifier: 0.3 part by weight alkylaryl polyglycol ether
    Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are inoculated with an aqueous conidium suspension of the apple scab causative organism *Fusicladium dendriticum Fuckel* and incubated for 18 hours in a humidity chamber at 18–20° C. and at an atmospheric humidity of 100%. The plants are then placed in a greenhouse where they dry.

After standing for a suitable period of time, the plants are sprayed dripping wet with the spray liquid prepared in the manner described above. The plants are subsequently placed in a greenhouse.

15 days after inoculation, the infestation of the apple seedlings is determined as a percentage of the untreated but also inoculated control plants.

0% means no infestation; 100% means that the infestation is exactly as great as in the case of the control plants.

The active compounds, the concentrations of the active compounds, the period of time between inoculation and spraying and the results obtained can be seen from the following Table 4.

TABLE 4.—FUSICLADIUM TEST/CURATIVE

| Active compound | Residence period in hours | Infection as a percentage of the infection of the untreated control with a concentration of active compound (in percent) of— | |
|---|---|---|---|
| | | 0.1 | 0.025 |
| 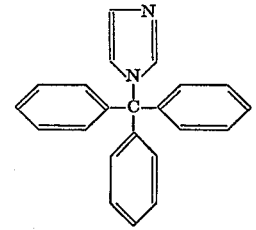 (known) | 42 | 68 | |
| 1 | 42 | 0 | |
| 2 | 42 | 1 | 0 |
| 3 | 42 | 0 | 0 |

EXAMPLE 5

Podosphaera test (powdery mildew of apples) [Protective]:
    Solvent: 4.7 parts by weight acetone
    Emulsifier: 0.3 part by weight alkylaryl polyglycol ether
    Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are sprayed with the spray liquid until dripping wet. The plants remain in a greenhouse for 24 hours at 20° C. and at a relative atmospheric humidity of 70%. They are then inoculated by dusting with conidia of the apple powdery mildew causative organism (*Podosphaera leucotricha* Salm.) and placed in a greenhouse at a temperature of 21–23° C. and at a relative atmospheric humidity of about 70%.

Ten days after the inoculation, the infestation of the seedlings is determined as a percentage of the untreated but also inoculated control plants.

0% means no infestation; 100% means that the infestation is exactly as great as in the case of the control plants.

The active compounds, the concentrations of the active compounds and the results obtained can be seen from the following Table 5.

TABLE 5.—PODOSPHAERA TEST/PROTECTIVE

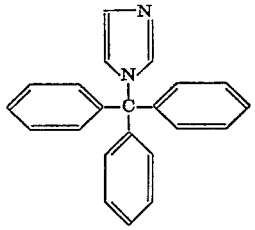

| Active compound | Infection as a percentage of the infection of the untreated control with a concentration of active compound (in percent) of— | |
| --- | --- | --- |
| | 0.00156 | 0.00078 |
| (known) | 18 | 49 |
| 1 | 5 | 9 |
| 2 | 1 | 1 |
| 3 | 4 | 7 |
| 4 | 1 | 7 |
| 5 | 0 | 0 |
| 6 | 0 | 3 |
| 7 | 1 | 5 |
| 8 | 1 | 18 |

EXAMPLE 6

Piricularia and Pellicularia test:
Solvent: 4 parts by weight acetone
Dispersing agent: 0.05 part by weight sodium oleate
Water: 95.75 parts by weight
Other additives: 0.2 part by weight gelatin The amount of active compound required for the desired concentration of active compound in the spray liquor is mixed with the stated amount of solvent, and the concentrate is diluted with the stated amount of water containing the stated additives.

2 batches each consisting of 30 rice plants about 2–4 weeks old are sprayed with the spray liquor until dripping wet. The plants remain in a greenhouse at temperatures of 22 to 24° C. and a relative atmospheric humidity of about 70% until they are dry. One batch of the plants is then inoculated with an aqueous suspension of 100,000 to 200,000 spores/ml. of Piricularia oryzae and placed in a chamber at 24–26° C. and 100% relative atmospheric humidity. The other batch of the plants is infected with a culture of Pellicularia sasakii grown on malt agar and placed at 28–30° C. and 100% relative atmospheric humidity.

5 to 8 days after inoculation, the infection of all the leaves present at the time of inoculation with Piricularia oryzae is determined as a percentage of the untreated but also inoculated control plants. In the case of the plants infected with Pellicularia sasakii, the infection on the leaf sheaths after the same time is also determined in proportion to the untreated but infected control. 0% means no infection; 100% means that the infection is exactly as great in the case of the control plants.

The active compounds, the concentrations of the active compounds and the results obtained can be seen from the following Table 6.

TABLE 6
PIRICULARIA(A)- AND PELLICULARIA(B) TEST

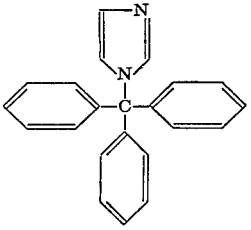

| Active compound | Infection as a percentage of the infection of the untreated control with a concentration of active compound (in percent) of— | | | |
| --- | --- | --- | --- | --- |
| | a | | b | |
| | 0.05 | 0.025 | 0.05 | 0.025 |
| (known) | 1 50 | 75 | | |
| 1 | 1 0 | 0 | 0 | 0 |
| 2 | 1 0 | 0 | 25 | 75 |
| 3 | 1 0 | 0 | 0 | 13 |
| 4 | 1 33 | | 0 | 25 |
| 7 | 1 25 | | 0 | 25 |
| 8 | 1 0 | 0 | 8 | |
| 9 | 1 25 | 25 | 50 | 58 |
| 20 | (1) | | 0 | 42 |

1 Prot.

EXAMPLE 7

Shoot treatment test/rust of cereals (wheat) (leaf-destroying mycosis)

To produce a suitable preparation of the active compound, 3 parts by weight of active compound are taken up in 50 parts by weight of dimethyl formamide, and 947 parts by weight of water are added. The concentrate is diluted with a 5%-strength aqueous solution of dimethyl formamide to the desired final concentration of the spray liquor.

To test for protective effectiveness, one-leaved young wheat plants of the variety Michigan Amber are contaminated with a suspension of uredospores of Puccinia triticna in 0.1%-strength water agar. After drying-on of the spore suspension, the wheat plants are sprayed with the preparation of active compound until dew-moist, and for incubation they are placed in a greenhouse for 24 hours at about 18° C. and an atmospheric humidity of 100%.

Testing for curative effectiveness takes place correspondingly, but with the difference that the treatment of the wheat plants with the preparation of the active compound does not take place until 48 hours after contamination, when the infection is already manifest.

After 10 days' residence period of the plants at a temperature of 18° C. and an atmospheric humidity of 80–90%, the infection of the plants with rust pustules is evaluated and the degree of effectiveness of the preparation of active compound is determined as a percentage. 0% means that the infection is exactly as great as in the untreated control, and 10% means that no rust pustules at all have developed.

The active compounds, the concentrations of the active compounds in the spray liquor and the degree of effectiveness can be seen from Table 7.

TABLE 7.—SHOOT TREATMENT TEST/RUST OF CEREALS (WHEAT)
(Leaf-destroying mycosis)

| Active compounds | Concentration of active compound in the spray liquor in percent | Degree of effectiveness in percent |
|---|---|---|
| *Protective treatment* | | |
| Untreated | | 0 |
| 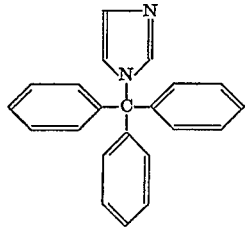 (known) | 0.1 | 0 |
| | 0.3 | 0 |
| 1 | 0.01 | 63 |
| 2 | 0.01 | 91 |
| 3 | 0.01 | 100 |
| 4 | 0.01 | 88 |
| 5 | 0.01 | 63 |
| 6 | 0.01 | 69 |
| 9 | 0.01 | 37 |
| 7 | 0.01 | 20 |
| 8 | 0.01 | 22 |
| *Curative treatment* | | |
| Untreated | | 0 |
| 1 | 0.01 | 100 |
| 2 | 0.01 | 100 |
| 3 | 0.01 | 100 |
| 4 | 0.01 | 31 |
| 5 | 0.01 | 100 |

EXAMPLE 8

Shoot treatment test/powder mildew of cereals (barley) (leaf-destroying mycosis)

To produce a suitable preparation of the active compound, 3 parts by weight of active compound are taken up in 50 parts by weight of dimethyl formamide, and 947 parts by weight of water are added. The concentrate is diluted with a 5%-strength aqueous solution of dimethyl formamide to the desired final concentration of the spray liquor.

To test for protective effectiveness, the one-leaved young barley plants of the variety Amsel are first sprayed with the preparation of active compound. After drying-on, the barley plants are dusted with conidia of *Erysiphe graminis* and placed in a greenhouse.

To test for curative effectiveness, the corresponding procedure is followed, but in reverse sequence. The treatment of the one-leaved young barley plants with the preparation of the active compound does not take place until 48 hours after contamination with the conidia of *Erysiphe graminis*.

After 6 days' residence period of the plants at a temperature of 22° C. and an atmospheric humidity of 80–90%, the infection of the plants with mildew pustules is evaluated and the degree of effectiveness of the preparation of active compound is determined as a percentage. 0% means that the infection is exactly as great as in the untreated control, and 100% means that no mildew pustules at all have developed.

The active compounds, the concentrations of the active compounds in the spray liquor and the degrees of effectiveness can be seen from Table 8.

TABLE 8.—SHOOT TREATMENT/RUST OF CEREALS (BARLEY)
(Leaf-destroying mycosis)

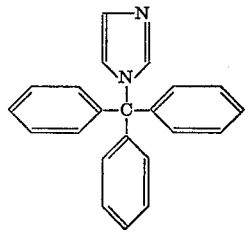

| Active compounds | Concentration of active compound in the spray liquor in percent | Degree of effectiveness in percent |
|---|---|---|
| *Protective treatment* | | |
| Untreated | | 0 |
| (known) | 0.03 | 20 |
| | 0.01 | 42 |
| 1 | 0.0001 | 50 |
| | 0.001 | 83 |
| | 0.01 | 92 |
| 2 | 0.01 | 79 |
| | 0.01 | 94 |
| 3 | 0.0001 | 75 |
| | 0.001 | 92 |
| | 0.01 | 100 |
| 4 | 0.0001 | 83 |
| | 0.001 | 92 |
| | 0.01 | 100 |
| 5 | 0.001 | 92 |
| | 0.01 | 92 |
| 6 | 0.0001 | 60 |
| | 0.001 | 97 |
| | 0.01 | 97 |
| 9 | 0.01 | 75 |
| 7 | 0.001 | 83 |
| | 0.01 | 83 |
| 8 | 0.0001 | 50 |
| | 0.001 | 93 |
| | 0.01 | 100 |
| *Curative treatment* | | |
| Untreated | | 0 |
| (known) | 0.001 | 12 |
| | 0.01 | 31 |
| 1 | 0.0001 | 81 |
| | 0.001 | 100 |
| | 0.01 | 100 |
| 2 | 0.001 | 100 |
| | 0.01 | 100 |
| 3 | 0.0001 | 58 |
| | 0.001 | 100 |
| | 0.01 | 100 |
| 4 | 0.001 | 100 |
| | 0.01 | 100 |
| 5 | 0.0001 | 27 |
| | 0.001 | 100 |
| | 0.01 | 100 |
| 6 | 0.0001 | 35 |
| | 0.001 | 100 |
| | 0.01 | 100 |
| 20 | 0.001 | 31 |
| | 0.01 | 100 |
| 9 | 0.001 | 65 |
| | 0.01 | 96 |
| 7 | 0.001 | 100 |
| | 0.01 | 100 |
| 8 | 0.001 | 96 |
| | 0.01 | 100 |

It will be appreciated that the instant specification and examples are set forth by way of illustration and not limitation, and that various modifications and changes may be made without departing from the spirit and scope of the present invention.

What is claimed is:

1. A method of combatting fungus pests which comprises applying to the pests or a habitat thereof a fungicidally effective amount of an N-arylalkylimidazole of the formula:

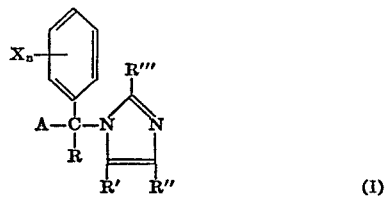

in which
R is adamantyl, aliphatic, or cycloaliphatic with up to 20 carbons atoms and which may contain an endomethylene bridge when R is cyclohexyl,
R', R" and R'" are hydrogen or alkyl with up to 6 carbon atoms, 2. The method of claim 1 containing as active ingredient a compound of the formula:

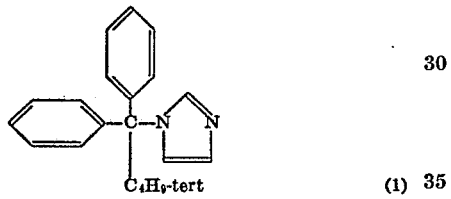

or a physiologically compatible acid salt thereof.

3. The method of claim 1 containing as active ingredient a compound of the formula:

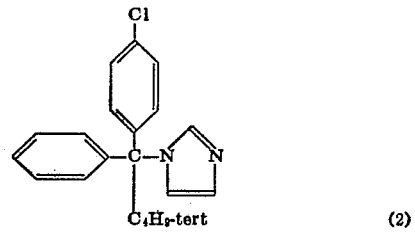

or a physiologically compatible acid salt thereof.

4. The method of claim 1 containing as active ingredient a compound of the formula:

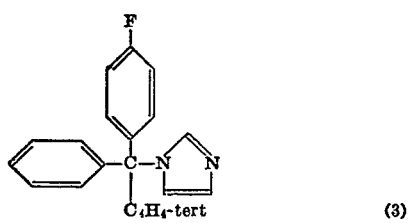

or a physiologically compatible acid salt thereof.

5. The method of claim 1 containing as active ingredient a compound of the formula:

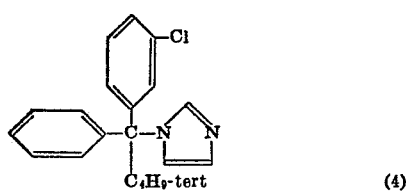

or a physiologically compatible acid salt thereof.

6. The method of claim 1 containing as active ingredient a compound of the formula:

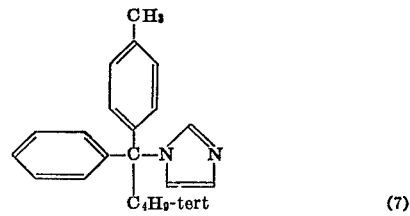

or a physiologically compatible acid salt thereof.

7. The method of claim 1 containing as active ingredient a compound of the formula:

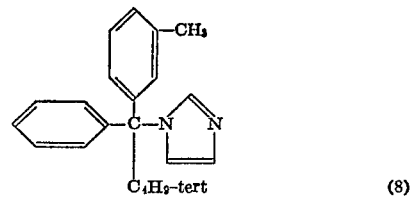

or a physiologically compatible acid salt thereof.

8. The method of claim 1 containing as active ingredient a compound of the formula:

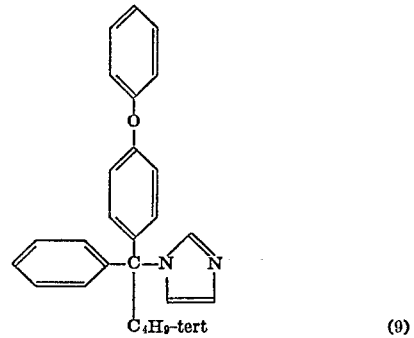

or a physiologically compatible acid salt thereof.

9. The method of claim 1 containing as active ingredient a compound of the formula:

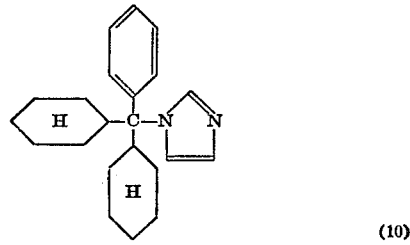

or a physiologically compatible acid salt thereof.

10. A fungicidal composition containing as active ingredient a fungicidally effective amount of an N-arylalkylimidazole of the formula

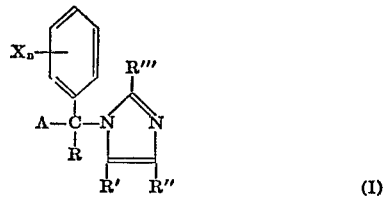

in which
R is adamantyl, aliphatic, or cycloaliphatic with up to 20 carbons atoms and which may contain an endomethylene bridge when R is cyclohexyl,
R', R" and R'" are hydrogen or alkyl with up to 6 carbon atoms, A is phenyl, fluorophenyl, chlorophenyl, methylphenyl, vinyl, pyridyl, alkyl or cycloalkyl with up to 12 carbon atoms, X is alkyl, alkoxy, alkylmercapto with up to 6 carbon atoms, phenoxy, phenyl, fluorine, chlorine, nitro, cyano, trifluoromethyl, or amino, and $n$ is 0, 1 or 2, or a physiologically compatible acid salt thereof, in admixture with an inert pesticide diluent.

11. The fungicidal composition of claim 10 wherein the active ingredient is:

1-imidazolyl-(1)-1,1-bisphenyl-2,2,2-trimethyl-ethane,
1-imidazolyl-(1)-1-(4-chlorophenyl)-1-phenyl-2,2,2-trimethyl-ethane,
1-imidazolyl-(1)-1-(4-fluorophenyl)-1-phenyl-2,2,2-trimethyl-ethane,
1-imidazolyl-(1)-1-(3-chlorophenyl)-1-phenyl-2,2,2-trimethyl-ethane,
1-imidazolyl-(1)-1-(4-methylphenyl)-1-phenyl-2,2,2-trimethyl-ethane,
1-imidazolyl-(1)-1-(3-methylphenyl)-1-phenyl-2,2,2-trimethyl-ethane,
1-imidazolyl-(1)-1-(4-phenoxyphenyl)-1-phenyl-2,2,2-trimethyl-ethane, or a physiologically compatible acid salt thereof.

References Cited

UNITED STATES PATENTS 3,321,366   5/1967   Mussell et al. _____ 424—273

OTHER REFERENCES

Chemical Abstracts, vol. 53, item 10190c–10191a, 1959.
Chemical Abstracts, vol. 54, item 15368c–16369g, 1960.

ALBERT T. MEYERS, Primary Examiner

D. W. ROBINSON, Assistant Examiner

U.S. Cl. X.R.

260—309